April 17, 1951   C. NICOLLE   2,549,513
PROCESS OF MAKING PACKAGES HAVING REMOVABLE
AND REPLACEABLE LIDS
Filed May 9, 1946   4 Sheets-Sheet 1
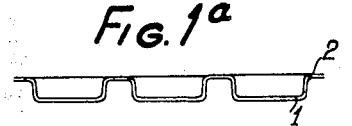
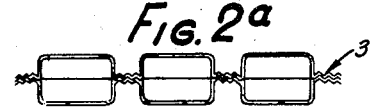
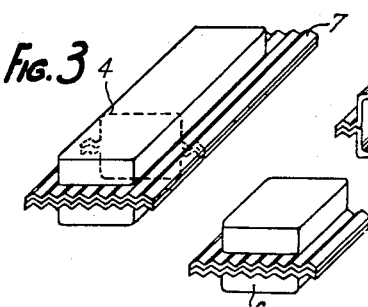
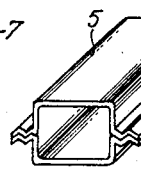
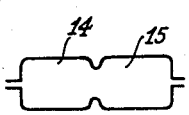
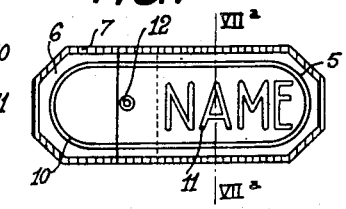
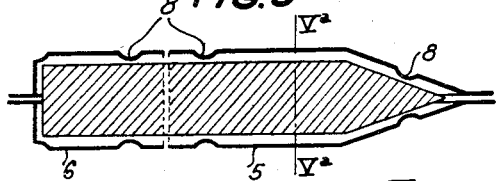
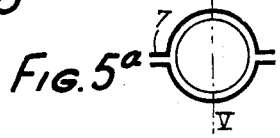
Inventor
Charles Nicolle
by his attorneys
Howson and Howson April 17, 1951  C. NICOLLE  2,549,513
PROCESS OF MAKING PACKAGES HAVING REMOVABLE
AND REPLACEABLE LIDS Filed May 9, 1946  4 Sheets-Sheet 2

Inventor
Charles Nicolle
by his attorneys
Howson and Howson

April 17, 1951 — C. NICOLLE — 2,549,513
PROCESS OF MAKING PACKAGES HAVING REMOVABLE AND REPLACEABLE LIDS
Filed May 9, 1946 — 4 Sheets-Sheet 3
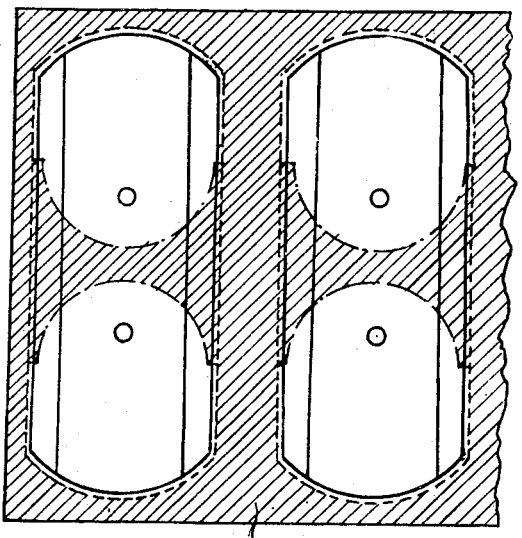
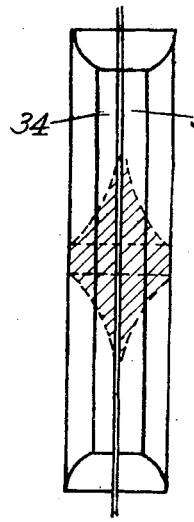
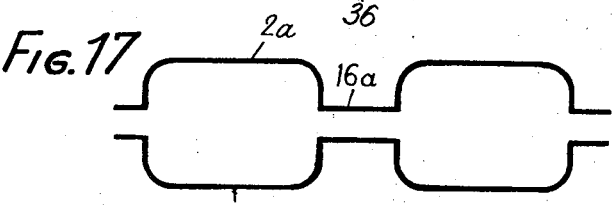
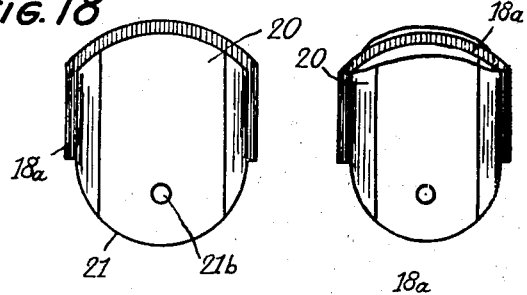
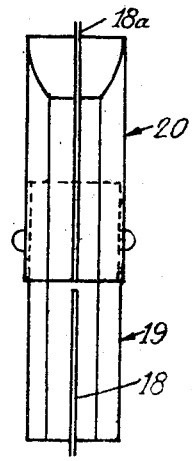
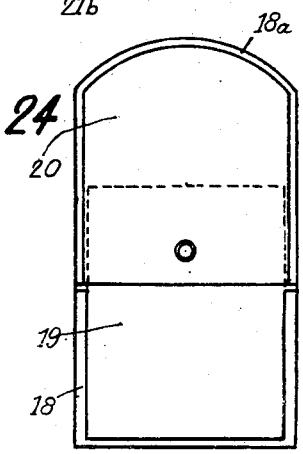
Inventor
Charles Nicolle
by his attorneys
Howson and Howson April 17, 1951     C. NICOLLE     2,549,513
PROCESS OF MAKING PACKAGES HAVING REMOVABLE
AND REPLACEABLE LIDS
Filed May 9, 1946     4 Sheets-Sheet 4
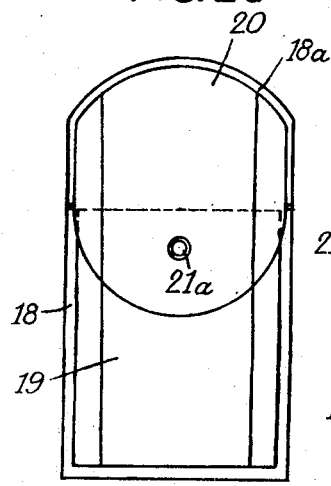
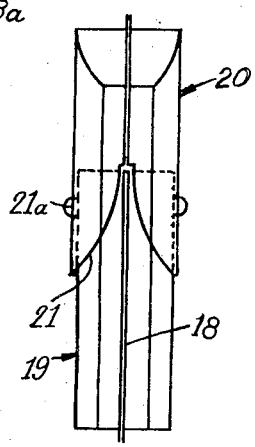
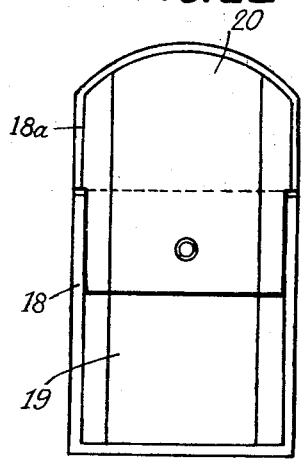
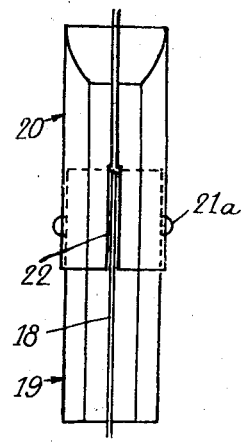
Inventor
Charles Nicolle
by his attorneys
Howson and Howson Patented Apr. 17, 1951

2,549,513

UNITED STATES PATENT OFFICE 2,549,513

PROCESS OF MAKING PACKAGES HAVING REMOVABLE AND REPLACEABLE LIDS

Charles Nicolle, Gentilly, France

Application May 9, 1946, Serial No. 668,560
In France December 3, 1943

Section 1, Public Law 690, August 8, 1946
Patent expires December 3, 1963

8 Claims. (Cl. 154—116)

This invention relates to packages, more especially of the type made of sheets or strips of a material which can be shaped by molding under pressure or otherwise, to form therein a row or rows of open cavities the walls of which project from one side of the sheet or strip and separated by relatively plane portions of the sheet.

Packages of the general type here in view have been made from plastic sheet or strip material such as for instance cellulose acetate. They have mainly served the purpose of wrapping small-size mass products such as pills, tablets, lipstick refills, pins, nails, buttons and the like. As a rule, in order to get at the packaged articles, the package had to be destroyed.

It is an object of this invention to provide a method of manufacturing in mass-production packages of this type which can be re-used after withdrawal of part or all of the articles enclosed therein, and more especially packages in two hollow parts, one part forming a lid fitting the other part, which is the main container. The lid may abut against a seat on the main container, or one part, preferably the lid, may be slightly larger in cross-section, so that it telescopes over the open end of the other part.

In the drawings affixed to this specification and forming part thereof several ways of proceeding in the manufacture of packages of the kind described are illustrated diagrammaticaly by way of example.

In the drawings:

Fig. 1 is a plan view and

Fig. 1a an end view of a sheet or strip molded so as to be formed with a plurality of cavities separated by plane portions.

Figs. 2 and 2a are similar views of a pair of sheets or strips formed with a row of cavities and united along the portions surrounding the cavities.

Fig. 3 is a perspective view of a single still unfinished package of the kind represented in Figs. 2 and 2a, and Fig. 4 is a similar view of the finished package consisting of two parts.

Figs. 5 and 5a are an axial section and a cross-section respectively of a modified form of package.

Figs. 6 and 6a, 7 and 7a, 8 and 8a are similar views of three further modifications obtainable in the process according to this invention.

Fig. 9 is a cross-section of a package according to the invention formed with inwardly projecting ribs dividing it into two compartments.

Figure 10:
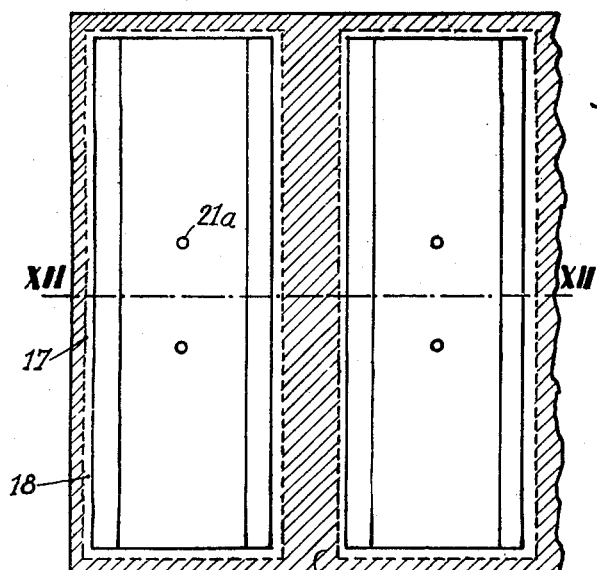
Figure 11:
Figure 12:
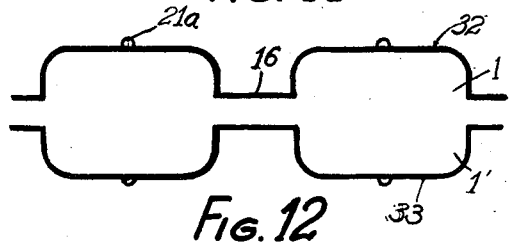

Figs. 10, 11 and 12 are a plan view, a side view and a cross-section respectively of an unfinished assembly, during manufacture, of two package bodies manufactured by a modified form of the process according to this invention.

Figure 13:
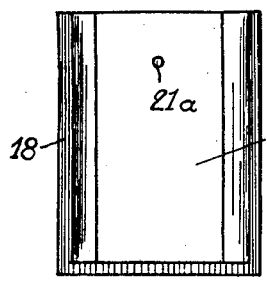
Figure 14:
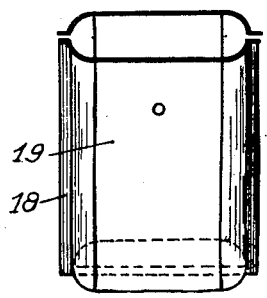
Figure 25:
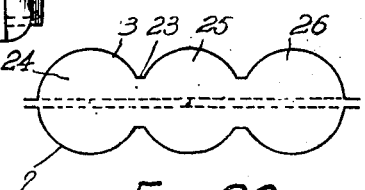

Figs. 13 and 14 are a side view and a perspective view, respectively, of one of the package bodies of Figs. 10–12, finished.

Figs. 15, 16 and 17 are a plan view, a side view and a cross-section, respectively, of an unfinished assembly, during manufacture, of two lids for the package bodies of Figs. 10–14.

Figs. 18 and 19 are a side view and a perspective view, respectively, of one of the lids of Figs. 15–17, finished.

Figs. 20 and 21, Figs. 22 and 23 and Figs. 24 and 25 are two different side views of three modified forms of complete packages that can be manufactured in accordance with this invention.

Fig. 26 is a cross-section of a package with three compartments.

Figure 27:
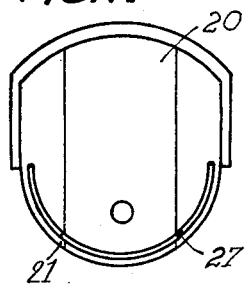

Fig. 27 is a side view of one more form of a lid made by the method according to this invention.

Referring to the drawings and first to Figs. 1 and 1a, 1 is one of the cavities produced by molding in the sheet or strip of moldable material, while 2 is part of the plane unmolded sheet portion surrounding the cavities.

Any suitable method may be used for molding the cavities. For example, the method and apparatus disclosed in my copending U. S. application Serial No. 610,622, filed August 13, 1945, now Patent No. 2,518,565, gives excellent results.

Figs. 2 and 2a illustrate an assembly of two such molded sheets having their plane portions permanently bonded together, so that the aligned cavities form sealed enclosures. The bonding may be done by heat sealing or by the use of a solvent or an adhesive. The cavities of the two sheets may be opposed, as illustrated in Fig. 2a. Alternatively, the cavities may internest, or only one of the two sheets may have cavities formed therein. These alternative constructions are illustrated in my copending U. S. application Serial No. 610,622, now Patent No. 2,518,565, referred to above.

In Figs. 2 and 2a, the plane sections 3 between the enclosures are shown as being fluted or corrugated to increase the area of the sealing surfaces, but they are still relatively plane as compared to the cavities.

Figs. 3 and 4 illustrate the steps of first cutting the flat portions 3 to separate the individual containers, and the dash-line 4 indicates the step of cutting each closed container in two in a plane at a large and preferably at right angles to the longitudinal edges of the container which is thereby divided into the main part 5 and the lid 6.

In the modifications of the invention illustrated in Figs. 1 to 9, the container and the lid are formed during the same process, just described. It follows that the container and the lid have the same cross-sectional area, so that when the two are assembled to form a complete container, the edges of the container butt against the edges of the lid.

The lid may have its edges held in abutment with the opposed edges of the main container body by the method illustrated in Fig. 5, wherein the container body and lid are provided with inwardly projecting ribs 8, which frictionally engage the article enclosed, which may be, as illustrated, a lipstick refill.

Figs. 6 and 6a, which show a tooth-brush container, illustrate another way of keeping the lid in place, a short sleeve 9 glued to the inner wall of the main portion 5 and projecting from its open end serving as a seat for the lid portion 6.

In Figs. 7 and 7a registering projections 12 formed in the two portions serve for keeping them together.

Figs. 8 and 8a show, in addition to the sleeve 9, reinforcing ribs 13 encircling the open ends of the container and the lid portions 5, 6.

Fig. 9 illustrates a package made according to this invention with inwardly projecting ribs dividing same into two compartments 14, 15.

In the modifications of the invention illustrated in Figs. 10 to 27, the container body and the lid are formed at different times, although by similar processes.

The lids are formed, in these modifications of the invention, with their cross-sectional areas slightly larger than that of the bodies, so that the lids can readily slide over and frictionally engage the open ends of the bodies to form the complete containers.

The methods of forming the lids and bodies are similar, being both basically similar to the method of forming lids and bodies described above in connection with Figs. 1–4.

As illustrated in Figs. 10 to 12, the container bodies are formed by first sealing together a pair of sheets whose cavities 32, 33 are twice the length of the container bodies to be obtained. These sheets are cut along the line XII—XII of Fig. 10. At the same time, or thereafter, a major part of the plane portions of the sheets, shown by the hatched area 37 in Fig. 10, is trimmed away. There result two container bodies, one of which is illustrated in Figs. 13 and 14, for each pair of opposed cavities 32, 33. The cavities 32, 33 are formed with rounded projections 21a, which later serve to hold the bodies and lids together.

The lids are formed by a similar process illustrated in Figs. 15 to 17. The pair of sheets shown as being sealed together in Figs. 15 and 16 have cavities 34, 35, at least twice the length of the lids to be produced and slightly larger than the cavities from which the bodies were produced. After the sheets are sealed together, the portions shown by the hatched area 36 in Fig. 15 are cut away, producing, for each pair of cavities 34, 35, two lids 20 (Figs. 18 and 19). Each lid 20 has an outer reinforcing rib 18a and two rounded wings 21 which fit over the container 19 and are provided with rounded projections 21b cooperating with the projections 21a on the container 19.

A completely assembled container, including a body section 19 and a lid 20, is illustrated in Figs. 20 and 21. Note that the cutting away of the hatched area 36 of Fig. 15 has removed enough of the reinforcing rib 18a so that the corresponding rib on the body section does not interfere with it.

Figs. 22–23 and 24–25 respectively show two modified forms of the container in Figs. 20 and 21. These modified forms differ chiefly in the manner in which the reinforcing ribs on body section or lid are cut away to avoid interference during assembly.

Fig. 26 shows a modified form of container having ribs 23 which divide the interior space into several compartments 24, 25, 26 for receiving separate articles.

In Fig. 27, the lower edge 21 of the lid is provided with a stiffening rib 27.

While in the foregoing description and in the drawings both sheets of a pair are shown as being molded to present cavities, it is obvious that the same process will also serve to make packages produced from one plane and one molded sheet.

Various changes can be made in the details shown and described without departing from the spirit of the invention or sacrificing the advantages thereof.

What is claimed is:

1. The process of making package sections from two sheets of packaging material, at least one of which has formed therein an open cavity surrounded by a plane portion, comprising the steps of permanently bonding said plane portion to a plane portion of the other sheet so as to close said cavity, and cutting the bonded sheets transversely of said cavity to form two package sections, each open at one end.

2. The process of mass-producing package sections from two sheets of packaging material, at least one of which has formed therein open cavities separated by plane portions, comprising the steps of permanently bonding said plane portions to plane portions of the other sheet so as to close said cavities, and cutting the bonded sheets transversely of said cavities and along said plane portions in directions parallel to the peripheries of said cavities to form a plurality of package sections, each open at one end.

3. The process of making a package with a removable and replaceable lid, comprising the steps of making two package sections according to the process of claim 1, and assembling said two sections with their open ends juxtaposed so that one section acts as a removable lid.

4. The process of making a package with a removable and replaceable lid as defined in claim 3, including the step of bonding one end of a sleeve within the open end of one of said sections so that the other end of the sleeve projects to serve as a seat for the open end of the other section.

5. The process of making a package with a removable and replaceable lid from two sheets of packaging material, one of which has formed therein an open cavity having spaced parallel upstanding ribs therein, said cavity being surrounded by a plane portion of said sheet, comprising the steps of permanently bonding said plane portion to a plane portion of the other sheet so as to close said cavity, cutting the bonded sheets transversely of said cavity between said ribs to form two package sections, each open at one end, and assembling said sections on an article to be enclosed by said package with said ribs frictionally engaging the article to hold the sections in place, one of said sections serving as a removable lid.

6. The process of making packages having removable and replaceable lids, comprising the steps of molding at least one of a first pair of sheets of packaging material to form therein a first open cavity surrounded by a plane portion, shaping at least one of a second pair of sheets of packaging material to form therein a second open cavity surrounded by a plane portion, said second cavity having internal dimensions slightly larger than the external dimensions of the first cavity, permanently bonding each of said plane portions to plane portions of the other sheet of the corresponding pair so as to close said cavities, cutting the bonded sheets of each pair transversely of said cavities to form four package sections, the two sections formed from said first pair of sheets being receivable inside the two sections formed from the second pair of sheets, and assembling a section formed from said first pair of sheets with a section formed from the second pair to produce a package with a removable lid.

7. The process of making packages having removable and replaceable lids, as defined in claim 6, including the step of cutting away the ends of the bonded plane portions of one of said package sections to avoid interference with the plane portions of the other section when the sections are assembled.

8. The process of mass-producing packages having removable and replaceable lids, comprising the steps of molding at least one of a first pair of sheets to form therein a first plurality of open cavities separated by plane portions, shaping at least one of a second pair of sheets of packaging material to form therein a second plurality of open cavities separated by plane portions, said second plurality of cavities having internal dimensions slightly larger than the external dimensions of said first plurality of cavities, permanently bonding each of said plane portions to plane portions of the other sheet of the corresponding pair so as to close said cavities, cutting the bonded sheets of one pair transversely of said cavities and along said plane portions in directions parallel to the peripheries of said cavities to form a first plurality of package sections, cutting the bonded sheets of the other pair parallel to the peripheries of said cavities and across said cavities so as to cut away part of said plane portions to form a second plurality of package sections having the ends of said plane portions cut away, and assembling each of the first plurality of sections in interfitting engagement with one of the second plurality of sections to form a plurality of packages with removable lids.

CHARLES NICOLLE.

REFERENCES CITED

The following references are of record in the file of this patent:

UNITED STATES PATENTS

| Number | Name | Date |
|---|---|---|
| 1,244,676 | Wilcox | Oct. 30, 1917 |
| 1,390,644 | Ritchie | Sept. 13, 1921 |
| 1,488,634 | Dunham | Apr. 1, 1924 |
| 1,539,854 | MacDonald | June 2, 1925 |
| 1,985,882 | Adler | Jan. 1, 1935 |
| 2,069,332 | Salfisberg | Feb. 2, 1937 |
| 2,069,334 | Salfisberg | Feb. 2, 1937 |
| 2,078,227 | Blum | Apr. 27, 1937 |
| 2,157,794 | MacDonald et al. | May 9, 1939 |
| 2,234,655 | Salfisberg | Mar. 11, 1941 |
| 2,263,835 | Atkinson | Nov. 25, 1941 |
| 2,358,246 | Nicolle | Sept. 12, 1944 |
| 2,518,565 | Nicolle | Aug. 15, 1950 |